United States Patent
Cuomo et al.

(10) Patent No.: US 9,515,974 B2
(45) Date of Patent: *Dec. 6, 2016

(54) ROUTING MESSAGES BASED ON GEOLOCATION INFORMATION ASSOCIATED WITH BOTH THE MESSAGE AND WITH SUBSCRIBERS

(71) Applicant: International Business Machines Corporation, Armonk, NY (US)

(72) Inventors: Gennaro Cuomo, Durham, NC (US); Gari Singh, Wilmington, MA (US); Shikhar Singh, Raleigh, NC (US); Meeta Yadav, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/628,343

(22) Filed: Feb. 23, 2015

(65) Prior Publication Data

US 2016/0021046 A1  Jan. 21, 2016

Related U.S. Application Data

(63) Continuation of application No. 14/332,551, filed on Jul. 16, 2014.

(51) Int. Cl.
*G06F 13/00* (2006.01)
*H04L 12/58* (2006.01)
(Continued)

(52) U.S. Cl.
CPC .......... *H04L 51/20* (2013.01); *G06F 17/3087* (2013.01); *G06F 17/30241* (2013.01); *H04L 45/48* (2013.01); *H04W 40/20* (2013.01)

(58) Field of Classification Search
CPC .............. G06Q 10/107; G06Q 17/3087; G06Q 17/30241; H04L 12/585; H04L 12/58; H04L 12/581; H04L 12/5855; H04L 45/48; H04L 51/20; H04W 40/20
(Continued)

(56) References Cited

U.S. PATENT DOCUMENTS

2014/0222573 A1* 8/2014 Middleton ......... G06Q 30/0261
705/14.58
2014/0222685 A1* 8/2014 Middleton ......... G06Q 30/0261
705/50

OTHER PUBLICATIONS

List of IBM Patent Applications Treated as Related—Date filed Aug. 4, 2015: 2 pages.

(Continued)

*Primary Examiner* — Robert B Harrell
(74) *Attorney, Agent, or Firm* — Cantor Colburn LLP; Nicholas Bowman (57) ABSTRACT

Embodiments relate to method and computer program products for routing messages based on geolocation information. Aspects include receiving a message from a publisher, computing a geo-hash for the message based on a location associated with the message, and traversing a geo-hash tree associated with a subscriber to determine if the geo-hash of the message corresponds to a geo-hash grid in the geo-hash tree. Based on determining that the geo-hash of the message corresponds to an identified geo-hash grid in the geo-hash tree, a point in a polygon algorithm is performed to determine if the location associated with the message is inside an area of interest associated with the identified geo-hash grid. If the location associated with the message is inside the area of interest, the message is forwarded to the subscriber.

7 Claims, 5 Drawing Sheets

(51) Int. Cl.
  *H04L 12/753*  (2013.01)
  *G06F 17/30*  (2006.01)
  *H04W 40/20*  (2009.01)

(58) Field of Classification Search
  USPC .......................................................... 709/206
  See application file for complete search history.

(56) References Cited

OTHER PUBLICATIONS

U.S. Appl. No. 14/817,415, filed Aug. 4, 2015; Entitled: Publishing Messages Based on Geographic Area.
List of IBM Patents or Patent Applications Treadted as Related—Date Filed: Feb. 23, 2015; 2 pages.
U.S. Appl. No. 14/332,551, filed Jul. 16, 2014; Entitled: Routing Messages Based on Geolocation Information.
U.S. Appl. No. 14/563,107, filed Dec. 8, 2014; Entitled: Publishing Messages Based on Geographic Area.

* cited by examiner

ROUTING MESSAGES BASED ON GEOLOCATION INFORMATION ASSOCIATED WITH BOTH THE MESSAGE AND WITH SUBSCRIBERS

DOMESTIC PRIORITY

This application is a continuation of the legally related U.S. application Ser. No. 14/332,551 filed Jul. 16, 2014 which is fully incorporated herein by reference.

BACKGROUND

The present invention relates generally to routing messages based on geolocation information and more particularly to routing messages in a publish/subscribe system based on geolocation information.

In general, a publish/subscribe messaging system delivers messages from producers to consumers by routing messages based on topics and predicate evaluation. Recently, there has been a desire to route messages based on location information such as the location of the subscriber and/or the publisher. As the number of internet connected devices continues to grow, the need to route a large volume of messages at a predictably low latency on geolocation information and to route messages on correlated sensor attribute and location information, will drastically increase the amount of messages to be routed based on location information.

Currently available messaging systems cannot keep up with the volume and latency requirements of real time messaging while accurately routing messages based on location information. Instead, in order to keep up with the with the volume and latency requirements of real time messaging currently available messaging systems sacrifice the accuracy of the location information used for routing messages. For example, many of these systems use a technique known as geo-hashing, which divides geographical areas into fixed size rectangles that are associated with a geo-hash code. Due to the fact that actual geographic areas of interest are seldom rectangles that perfectly align with a rectangle associated with a specific geo-hash code, geo-hashing suffers from both false positives and false negatives which can cause negative consequences.

SUMMARY

Embodiments include methods routing messages based on geolocation information. The method includes receiving a message from a publisher, computing a geo-hash for the message based on a location associated with the message, and traversing one or more geo-hash trees associated with one or more subscribers to determine if the geo-hash of the message corresponds to a geo-hash grid in the one or more geo-hash trees. Based on determining that the geo-hash of the message corresponds to an identified geo-hash grid in the one or more geo-hash trees, the method includes performing a point in a polygon algorithm to determine if the location associated with the message is inside an area of interest associated with the identified geo-hash grid. Based on determining that the location associated with the message is inside the area of interest associated with the identified geo-hash grid, the method includes forwarding the message to one of the one or more subscribers associated with the geo-hash tree containing the identified geo-hash grid.

Embodiments also include a computer program product for routing messages based on geolocation information, the computer program product including a tangible storage medium readable by a processing circuit and storing instructions for execution by the processing circuit for performing a method. The method includes receiving a message from a publisher, computing a geo-hash for the message based on a location associated with the message, and traversing one or more geo-hash trees associated with one or more subscribers to determine if the geo-hash of the message corresponds to a geo-hash grid in the one or more geo-hash trees. Based on determining that the geo-hash of the message corresponds to an identified geo-hash grid in the one or more geo-hash trees, the method includes performing a point in a polygon algorithm to determine if the location associated with the message is inside an area of interest associated with the identified geo-hash grid. Based on determining that the location associated with the message is inside the area of interest associated with the identified geo-hash grid, the method includes forwarding the message to one of the one or more subscribers associated with the geo-hash tree containing the identified geo-hash grid.

Embodiments further include a messaging system for routing messages based on geolocation information, the messaging system comprising a processor configured for performing a method. The method includes receiving a message from a publisher, computing a geo-hash for the message based on a location associated with the message, and traversing one or more geo-hash trees associated with one or more subscribers to determine if the geo-hash of the message corresponds to a geo-hash grid in the one or more geo-hash trees. Based on determining that the geo-hash of the message corresponds to an identified geo-hash grid in the one or more geo-hash trees, the method includes performing a point in a polygon algorithm to determine if the location associated with the message is inside an area of interest associated with the identified geo-hash grid. Based on determining that the location associated with the message is inside the area of interest associated with the identified geo-hash grid, the method includes forwarding the message to one of the one or more subscribers associated with the geo-hash tree containing the identified geo-hash grid.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
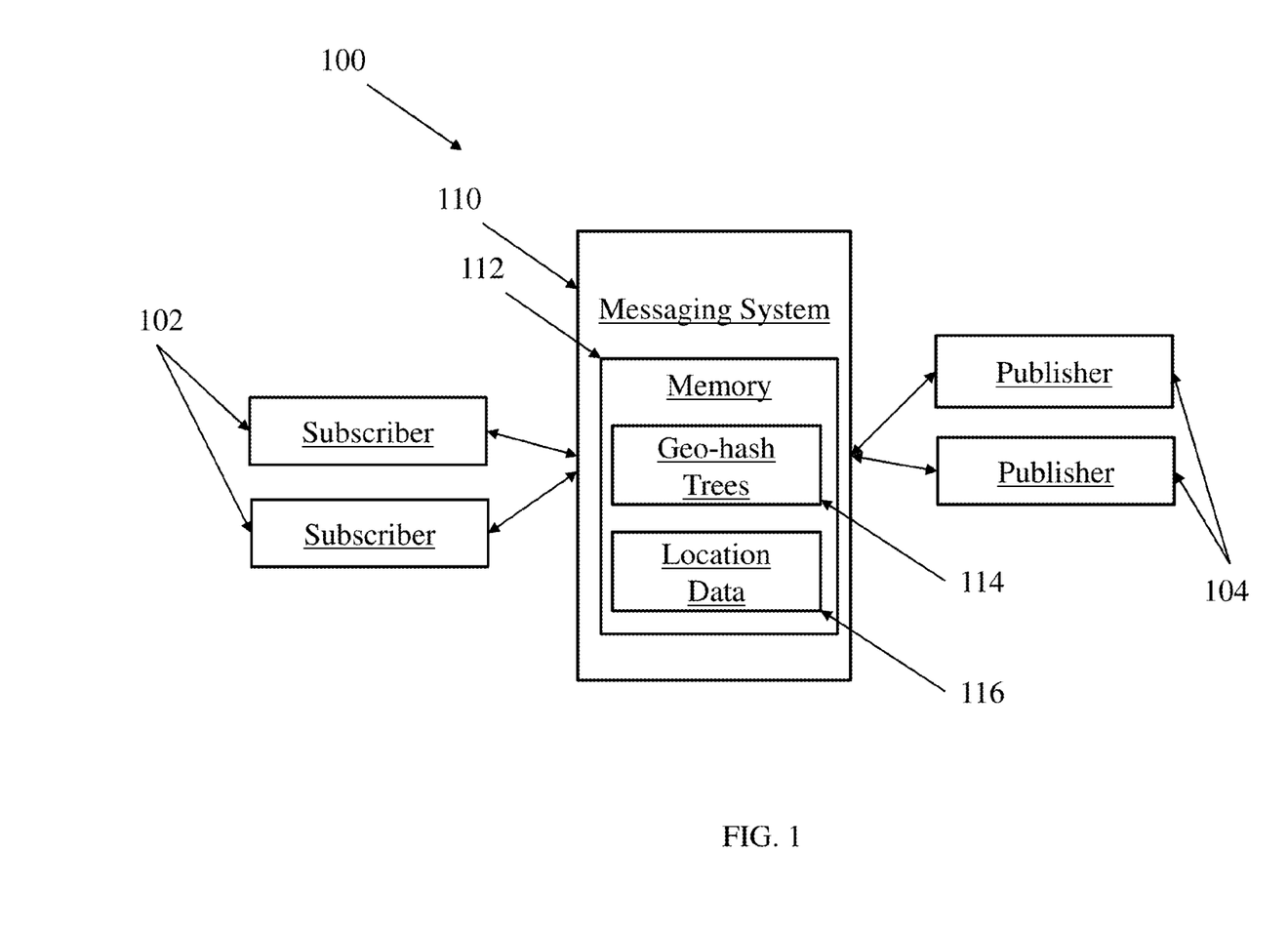
FIG. 1 depicts a block diagram of a system for routing messages based on geolocation information in accordance with an exemplary embodiment.

Referring to the drawings in more detail, and particularly referring to FIG. 1, a system 100 for routing messages based on geolocation information in accordance with an exemplary embodiment is shown. As illustrated the system 100 includes one or more subscribers 102 and one or more publishers 104 that are in communication with a messaging system 110. In exemplary embodiments, each of the publishers 104 utilizes the messaging system 110 to set a geographic area associated with messages that the publishers 104 will publish through the messaging system 110. For example, a publisher, such as a local merchant, may create a geographic area of a small area around their store to publish messages regarding sales, events and the like. Likewise another publisher, such as local newspaper, may create several geographic areas that include areas for each neighborhood in a large metropolitan area and another geographic area that includes the entire metropolitan area.

In exemplary embodiments, each of the subscribers 102 utilizes the messaging system 110 to subscribe to receive published messages from one or more publishers 104 based on a geographic area set by the subscriber. For example, the subscribers use the messaging system to create a geographic area of interest that corresponds to an area for which they would like to receive published messages. In exemplary embodiments, the subscribers may create a plurality of geographic area of interest and may set other limitations on when they would like to receive messages. For example, a subscriber may create a geographic area around his home, one for the area around his office and one that covers the area in between the two. The subscriber may wish to receive all published messages relating to news and community information regarding the area around his home. However, the subscriber may wish to only receive published messages relating to traffic information regarding the area around his office during business days. In exemplary embodiments, the subscribers may use the messaging system to select messages to receive based on one or more of a location, day and time, subject matter or the like.

In exemplary embodiments, the messaging system 110 includes a memory 112 that may include, but is not limited to, one or more subscriber trees 114, also referred to herein as geo-hash trees, that each corresponds to one of the subscribers 102 and location data 116. The location data 116 may include, but is not limited to, the geographic areas of interest that were defined by the subscribers 102 and the publishers 104. In exemplary embodiments, the subscribers 102, the publishers 104 and the messaging system 110 may be embodied in a computer system as shown and described with reference to FIG. 2. In exemplary embodiments the subscribers 102 and the publishers 104 may be embodied in smartphones, tablets or other computing devices.

Figure 2:
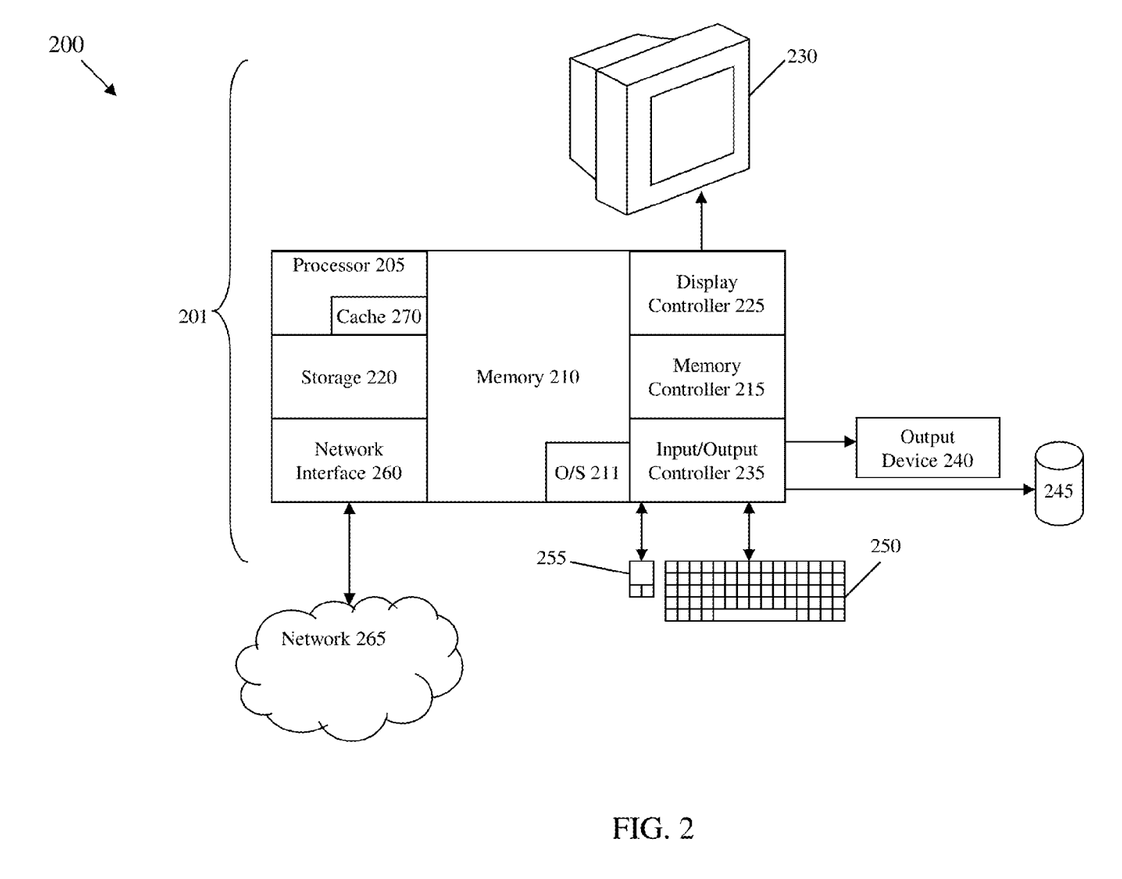
FIG. 2 depicts a block diagram of a computing system in accordance with an exemplary embodiment.

FIG. 2 illustrates a block diagram of an exemplary computer system 200 for use with the teachings herein. The methods described herein can be implemented in hardware software (e.g., firmware), or a combination thereof. In an exemplary embodiment, the methods described herein are implemented in hardware, and is part of the microprocessor of a special or general-purpose digital computer, such as a personal computer, workstation, minicomputer, or mainframe computer. The system 200 therefore includes general-purpose computer 201.

In an exemplary embodiment, in terms of hardware architecture, as shown in FIG. 2, the computer 201 includes a processor 205, memory 210 coupled via a memory controller 215, a storage device 220, and one or more input and/or output (I/O) devices 240, 245 (or peripherals) that are communicatively coupled via a local input/output controller 235. The input/output controller 235 can be, for example, but not limited to, one or more buses or other wired or wireless connections, as is known in the art. The input/output controller 235 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The storage device 220 may include one or more hard disk drives (HDD), solid state drives (SSD), or any other suitable form of storage.

The processor 205 is a computing device for executing hardware instructions or software, particularly that stored in memory 210. The processor 205 can be any custom made or commercially available processor, a central processing unit (CPU), an auxiliary processor among several processors associated with the computer 201, a semiconductor based microprocessor (in the form of a microchip or chip set), a macroprocessor, or generally any device for executing instructions. The processor 205 may include a cache 270, which may be organized as a hierarchy of more cache levels (L1, L2, etc.).

The memory 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 210 may incorporate electronic, magnetic, optical, and/or other types of storage media. Note that the memory 210 can have a distributed architecture, where various components are situated remote from one another, but can be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially controls the execution of other computer programs and provides scheduling, input-output control, file and data management, memory management, and communication control and related services.

In an exemplary embodiment, a conventional keyboard 250 and mouse 255 can be coupled to the input/output controller 235. Other output devices such as the I/O devices 240, 245 may include input devices, for example but not limited to a printer, a scanner, microphone, and the like. Finally, the I/O devices 240, 245 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 200 can further include a display controller 225 coupled to a display 230. In an exemplary embodiment, the system 200 can further include a network interface 260 for coupling to a network 165. The network 265 can be an IP-based network for communication between the computer 201 and any external server, client and the like via a broadband connection. The network 265 transmits and receives data between the computer 201 and external systems. In an exemplary embodiment, network 265 can be a managed IP network administered by a service provider. The network 265 may be implemented in a wireless fashion, e.g., using wireless protocols and technologies, such as Wi-Fi, WiMax, etc. The network 265 can also be a packet-switched network such as a local area network, wide area network, metropolitan area network, Internet network, or other similar type of network environment. The network 265 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 201 is a PC, workstation, intelligent device or the like, the instructions in the memory 210 may further include a basic input output system (BIOS) (omitted for simplicity). The BIOS is a set of essential routines that initialize and test hardware at startup, start the OS 211, and support the transfer of data among the storage devices. The BIOS is stored in ROM so that the BIOS can be executed when the computer 201 is activated.

When the computer 201 is in operation, the processor 205 is configured to execute instructions stored within the memory 210, to communicate data to and from the memory 210, and to generally control operations of the computer 201 pursuant to the instructions.

Figure 3:
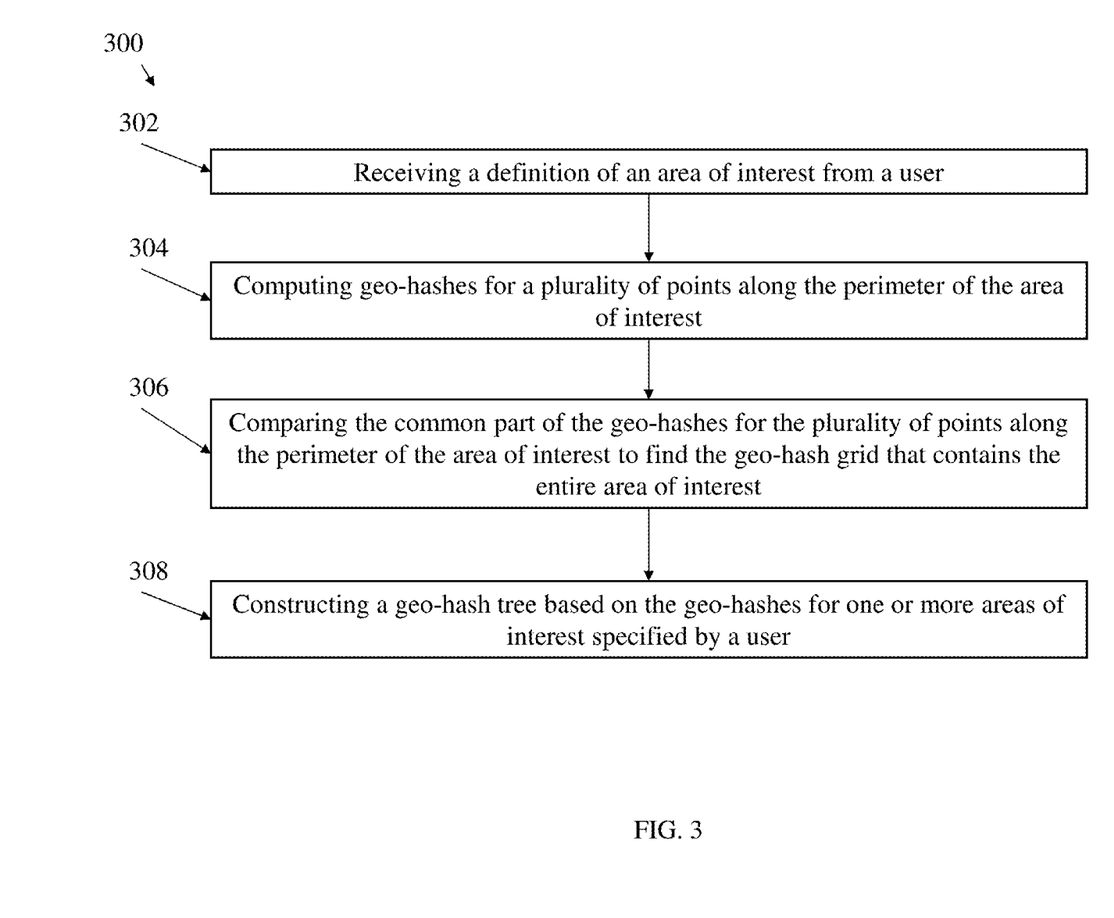
FIG. 3 depicts a block diagram illustration of a method for creating a geo-hash tree in accordance with an exemplary embodiment.

Referring now to FIG. 3, a flow chart diagram of a method 300 for creating a geo-hash tree in accordance with an exemplary embodiment is shown. As shown at block 302, the method 300 includes receiving a definition of an area of interest from a user. In exemplary embodiments, the definition of an area of interest is a geographic area that is specified by a user, which may be a publisher or a subscriber. In exemplary embodiments, the user may create the definition of the area of interest by drawing the area of interest on a map. For example, a user may use a GUI interface to draw a polygon representing an area of interest. In another example, a user may use a GUI interface to select a point of interest and a desired radius to create the definition area of interest.

Next, as shown at block 304, the method 300 includes computing geo-hashes for a plurality of points along the perimeter of the area of interest. For example, if the area of interest is a polygon, a geo-hash is computed for each corner of the polygon. In another example, if the area of interest is a circle, a geo-hash is computed for a plurality of points along the circumference of the circle. As used herein a geo-hash is a well-known hierarchical spatial data structure which subdivides space into buckets of grid shape. In exemplary embodiments, a geo-hash is computed based on converting numerical latitude and longitude coordinates to a base 32 numbering system. In general, geo-hashes offer arbitrary precision by removing characters from the end of the code to reduce its size.

Next, as shown at block 306, the method 300 includes comparing the common part of the geo-hashes for the plurality of points along the perimeter of the area of interest to find the geo-hash grid that contains the entire area of interest. Next, as shown at block 308, the method includes constructing a geo-hash tree based on the geo-hashes for one or more areas of interest specified by a user. In exemplary embodiments, the geo-hash tree is constructed by adding each of the geo-hash grids that contains each of the entire area of interests specified by the user to a tree structure.

Figure 4:
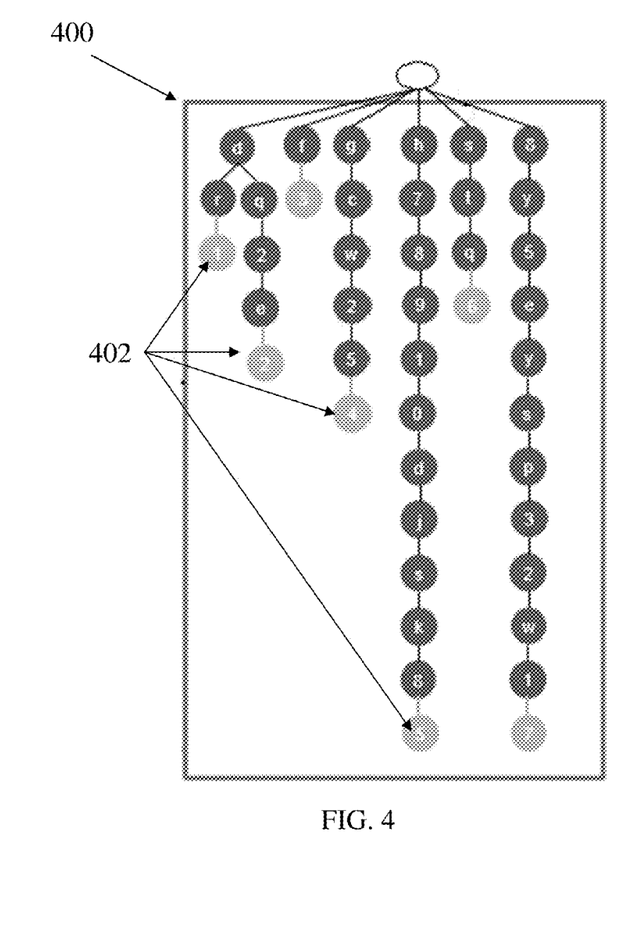
FIG. 4 depicts a geo-hash tree in accordance with an exemplary embodiment.

FIG. 4 illustrates a geo-hash tree 400 in accordance with an exemplary embodiment. As shown the geo-hash tree 400 includes seven geo-hash grids, which each correspond to a geo-hash link 402 that contains the entire area of interest. For example, geo-hash grid DR corresponds to a geo-hash link 402 that contains the entire area of interest illustrated as "1." Likewise, geo-hash grid GCW25 corresponds to a geo-hash link 402 that contains the entire area of interest illustrated as "3." As the geo-hash grid becomes longer, that is as the number of characters in the geo-hash grid increases, the area represented becomes smaller. In exemplary embodiments, the geo-hash link 402 points to a stored definition of the actual geographic area of interest specified by the user that corresponds to the geo-hash grid.

Figure 5:
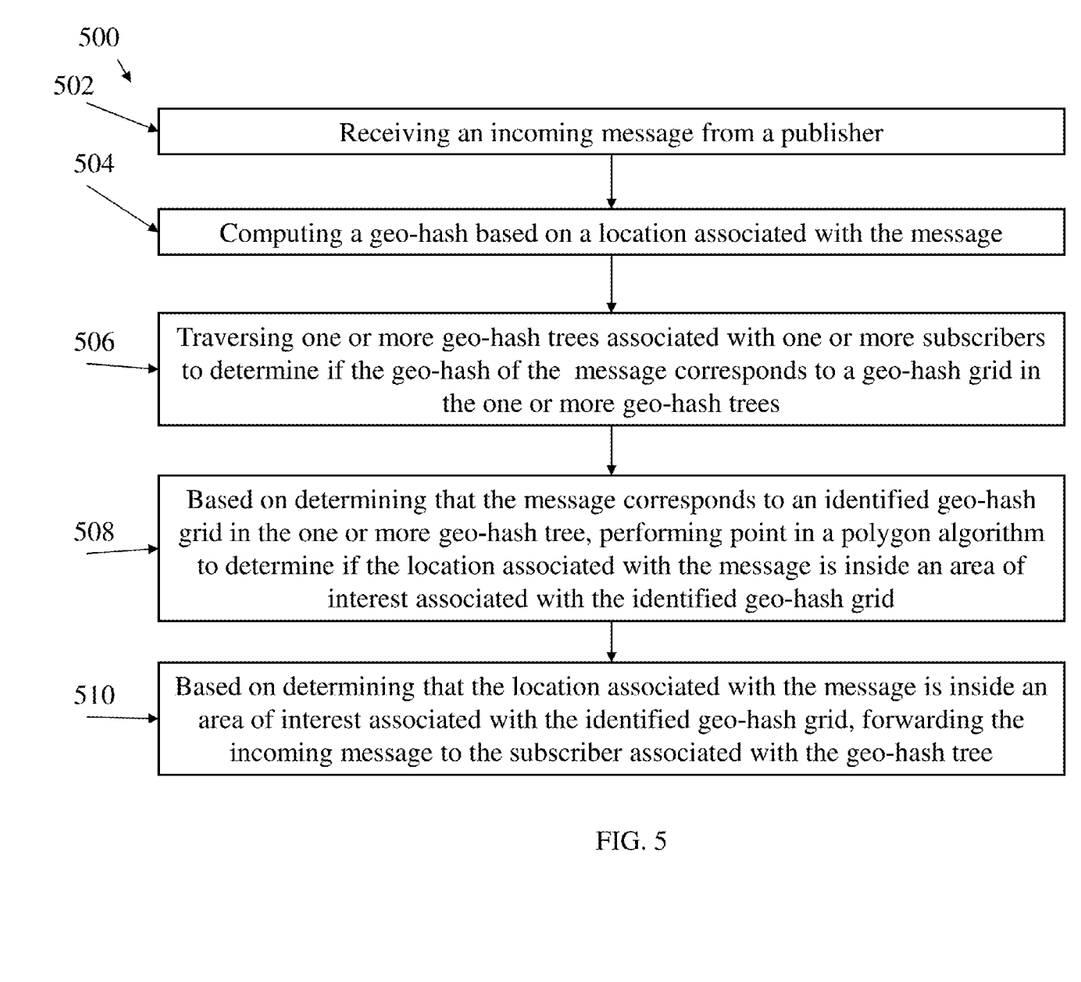
FIG. 5 depicts a block diagram illustration of a method for routing messages based on geolocation in accordance with an exemplary embodiment.

Referring now to FIG. 5, a flow chart diagram of a method 500 for routing messages based on geolocation in accordance with an exemplary embodiment is shown. As shown at block 502, the method 500 includes receiving an incoming message from a publisher. Next, as shown at block 504, the method 500 includes computing a geo-hash based on a location associated with the message. After the geo-hash associated with the message is computed, the method 500 includes traversing one or more geo-hash trees associated with one or more subscribers to determine if the geo-hash of the message corresponds to a geo-hash grid in the one or more geo-hash trees, as shown at block 506. In exemplary embodiments, determining if the geo-hash of the message corresponds to a geo-hash grid in the one or more geo-hash trees includes performing longest prefix match between the geo-hash of the message and the geo-hash grids of the one or more geo-hash trees.

Continuing with reference to FIG. 5, based on determining that the message corresponds to an identified geo-hash grid in the one or more geo-hash trees, the method 500 includes performing a point in a polygon algorithm to determine if the location associated with the message is actually inside the linked area of interest associated with the identified geo-hash grid, as shown at block 508. In exemplary embodiments, a point in polygon algorithm determines problem whether a given point is located inside, outside, or on the boundary of a polygon. Various point in polygon algorithms are well known and any of the well-known point in polygon algorithms, such as ray casting or angle summation. Based on determining that the geo-hash of the message does not correspond to any of the geo-hash grids in the one or more geo-hash trees, the method 500 includes discarding the message. Based on determining that the location associated with the message is inside an area of interest associated with the identified geo-hash grid, the method 500 includes forwarding the incoming message to the subscriber associated with the geo-hash tree, as shown at block 510. Based on determining that the location associated with the message is outside the area of interest associated with the identified geo-hash grid, the method 500 includes discarding the message.

In exemplary embodiments, the method for routing messages based on geolocation is capable of routing a large volume of geolocation messages at predictably low latency with extremely high accuracy. In one embodiment, the method for routing messages based on geolocation achieves 100% accuracy and has a 0% false positive and 0% false negative rate.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for routing messages based on geolocation information, the method comprising;
   receiving an message from a publisher;
   computing a geo-hash for the message based on a location associated with the message;
   traversing one or more geo-hash trees associated with one or more subscribers to determine if the geo-hash of the message corresponds to a geo-hash grid in the one or more geo-hash trees;
   based on determining that the geo-hash of the message corresponds to an identified geo-hash grid in the one or more geo-hash trees, performing a point in a polygon algorithm to determine if the location associated with the message is inside an area of interest associated with the identified geo-hash grid; and
   based on determining that the location associated with the message is inside the area of interest associated with the identified geo-hash grid, forwarding the message to one of the one or more subscribers associated with the geo-hash tree containing the identified geo-hash grid.

2. The method of claim 1, wherein the each of the one or more geo-hash trees is created by:
   receiving a definition of an area of interest from one of the one or more subscribers;
   computing geo-hashes for a plurality of points along the perimeter of the area of interest;
   comparing a common part of the geo-hashes for the plurality of points along the perimeter of the area of interest to find a geo-hash grid that contains the area of interest; and
   adding the geo-hash grid that contains the entire area of interest to the geo-hash tree associated with the one of the one or more subscribers.

3. The method of claim 2, wherein the area of interest is a polygon created by the one of the one or more subscribers using a graphical user interface.

4. The method of claim 3, wherein the plurality of points along the perimeter of the area of interest includes each vertex of the polygon.

5. The method of claim 1, wherein determining if the geo-hash of the message corresponds to the geo-hash grid in the one or more geo-hash trees comprises performing a longest prefix match between the geo-hash of the message and the geo-hash grids of the one or more geo-hash trees.

6. The method of claim 1, further comprising based on determining that the geo-hash of the message does not corresponds to any of the geo-hash grids in the one or more geo-hash trees, discarding the message.

7. The method of claim 1, further comprising based on determining that the location associated with the message is outside the area of interest associated with the identified geo-hash grid, discarding the message.

* * * * *